(12) United States Patent
Aljundi et al.

(10) Patent No.: US 11,684,896 B2
(45) Date of Patent: Jun. 27, 2023

(54) RICE-HUSK DERIVED SILICON CARBIDE MEMBRANE SORBENT FOR OIL REMOVAL

(71) Applicant: KING FAHD UNIVERSITY OF PETROLEUM AND MINERALS, Dhahran (SA)

(72) Inventors: Isam H. Aljundi, Dhahran (SA); Chanbasha Basheer, Dhahran (SA); Rashed Saed Bakdash, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 537 days.

(21) Appl. No.: 16/782,662

(22) Filed: Feb. 5, 2020

(65) Prior Publication Data
US 2021/0237003 A1   Aug. 5, 2021

(51) Int. Cl.
| | |
|---|---|
| B01D 71/02 | (2006.01) |
| B01D 71/68 | (2006.01) |
| B01D 71/62 | (2006.01) |
| C02F 103/36 | (2006.01) |
| C01B 32/956 | (2017.01) |
| B01D 67/00 | (2006.01) |
| C02F 1/44 | (2023.01) |
| C02F 101/32 | (2006.01) |

(52) U.S. Cl.
CPC ........ *B01D 71/02* (2013.01); *B01D 67/0013* (2013.01); *B01D 71/62* (2013.01); *B01D 71/68* (2013.01); *C02F 1/447* (2013.01); *B01D 2323/21* (2013.01); *B01D 2323/26* (2013.01); *B01D 2325/02* (2013.01); *B01D 2325/36* (2013.01); *C01B 32/956* (2017.08); *C02F 2101/325* (2013.01); *C02F 2103/365* (2013.01)

(58) Field of Classification Search
None
See application file for complete search history.

(56) References Cited

U.S. PATENT DOCUMENTS 9,999,996 B2    6/2018  Lee et al.
2018/0179071 A1*  6/2018  Cho .................... C01F 5/02

FOREIGN PATENT DOCUMENTS

| CN | 100534593 C | 9/2009 |
|---|---|---|
| CN | 101711954 A | 5/2010 |
| CN | 104815615 A | 8/2015 |
| CN | 107381704 A | 11/2017 |
| CN | 107708833 A | 2/2018 |
| CN | 107849293 A | 3/2018 |

(Continued)

OTHER PUBLICATIONS

Size and Surface Chemistry Tuning of Silicon Carbide Nanoparticles by Alekseev et al. (Year: 2017).*

(Continued)

*Primary Examiner* — Kara M Peo
(74) *Attorney, Agent, or Firm* — Oblon, McClelland, Maier & Neustadt, L.L.P.

(57) ABSTRACT

A membrane sorbent is described, which comprises 1-6 wt % silicon carbide nanoparticles dispersed in a polymer matrix. The polymer matrix may comprise polysulfone and polyvinylpyrrolidone. The membrane sorbent is used for separating oil from a contaminated water mixture. The silicon carbide nanoparticles of the membrane sorbent may be made from rice husk ash.

20 Claims, 10 Drawing Sheets

(56) References Cited

FOREIGN PATENT DOCUMENTS

| CN | 108176355 A | 6/2018 |
|---|---|---|
| CN | 108249614 A | 7/2018 |
| CN | 108579473 B | 4/2019 |

OTHER PUBLICATIONS

L. Vlaev, et al., "Cleanup of water polluted with crude oil or diesel fuel using rice husks ash", Journal of the Taiwan Institute of Chemical Engineers, vol. 42, Issue 6, Nov. 2011, pp. 957-964.

Qiao-Ling Gao, et al., "A facile approach to silica-modified polysulfone microfiltration membranes for oil-in-water emulsion separation", RSC Advances, vol. 6, Issue 47, Apr. 13, 2016, pp. 41323-41330 (Abstract only).

Sutham Niyomwas, "Synthesis and Characterization of Silicon-Silicon Carbide Composites from Rice Husk Ash via Self-Propagating High Temperature Synthesis", Journal of Metals, Materials and Minerals, vol. 19, No. 2, 2009, pp. 21-25.

E.J. Siqueira, et al., "Preparation and characterization of ceramic composites derived from rice husk ash and polysiloxane", Ceramics International, vol. 35, Issue 1, Jan. 2009, pp. 213-220 (Abstract only).

Richard J. Ciora, et al., "Preparation and reactive applications of nanoporous silicon carbide membranes", Chemical Engineering Science, vol. 59, Issues 22-23, Nov.-Dec. 2004, pp. 4957-4965 (Abstract only).

Aleksandar Dimitrov, et al., "Using Pyrolyzed Rice Husks as an Adsorbent for Purification of Water Basins Polluted with Diesel Fuel", Water, Air, & Soil Pollution, vol. 223, Issue 8, Oct. 2012, pp. 5087-5095.

\* cited by examiner

RICE-HUSK DERIVED SILICON CARBIDE MEMBRANE SORBENT FOR OIL REMOVAL

BACKGROUND OF THE INVENTION

Technical Field

The present invention relates to a membrane sorbent comprising silicon carbide nanoparticles in a polymer matrix, and a method of using the membrane sorbent to remove oil from a contaminated water mixture.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the oil and gas industry, large quantities of water are produced as a byproduct of oil and gas production. It is the largest waste stream generated in the industry. Globally, about 250 million barrels of water are produced daily from both oil and gas fields, and more than 40% of this is discharged into the environment. See Daniel Arthur J, Langhus B G, Patel C. Technical Summary of Oil & Gas Produced Water Treatment Technologies. NETL; 2005, incorporated herein by reference in its entirety. Saudi Arabia is the world's second largest oil-producing country with a daily production of about 10 million barrels per day. Generally, the oil/water volume ratio is 1:3. See Fakhru'l-Razi A, Pendashteh A, Abdullah L C, et al. Review of technologies for oil and gas produced water treatment. J Hazard Mater 2009; 170:530-51, incorporated herein by reference in its entirety. Accordingly, 30 million barrels (almost 1 billion US gallons) of produced water is generated every day in Saudi Arabia. The oil/water ratio could be much higher. For example, in the Permian Basin of Texas, the average well produces 7 barrels of water for each barrel of oil, which represents 400 million gallons of produced water per day. See David B. Burnett, Potential for Beneficial Use of Oil and Gas Produced Water, https://web.archive.org/web/20111127071443/http://www.circleofblue.org/waternews/wp-content/uploads/2010/09/beneficialuses-produced-water.pdf, incorporated herein by reference in its entirety.

There are many conventional treatments of oily water to remove oil, dissolved grease, etc. See Enrico Drioli and Lidietta Giorno (Editors), Comprehensive Membrane Science and Engineering, 2010 Elsevier, incorporated herein by reference in its entirety. Conventional methods include gravity separation and skimming, dissolved air flotation, de-emulsification, coagulation, and flocculation. See S. Mondal, S. R. Wickramasinghe, Produced water treatment by nanofiltration and reverse osmosis membranes, Journal of Membrane Science 322 (2008) 162-170, incorporated herein by reference in its entirety.

Gravity separation is one of the primary technologies for produced water treatment and is especially used with skimming. By increasing the buoyancy of the smaller oil droplets, separation can be improved using dissolved air flotation (DAF). Based on the method of gas bubble generation and the size of the bubble, gas flotation is divided into two types (dissolved and induced gas flotation). In induced gas flotation, bubbles are created by propellers or mechanical shear. In dissolved gas flotation, vacuum or pressure drop is used to create the gas bubbles. See Ebenezer T. Igunnu and George Z. Chen, Produced water treatment technologies, International Journal of Low-Carbon Technologies 2012, 0, 1-21, incorporated herein by reference in its entirety.

Hydrocyclones and centrifuges are also used in oily water treatment. However, it is limited by the large energy required and the inefficiency in removing smaller molecules. Other physical, chemical, and biological methods (such as adsorption, sand filters, evaporators, oxidation, catalytic treatment, ozone, bio-reactors) are also used. Nonetheless, each method has its own advantages and disadvantages as explained in detail in Ismail et al. See Ismail, A. F. et al., Membrane technology enhancement in oil-water separation. A review, Desalination 357 (2015) 197-207, incorporated herein by reference in its entirety.

In short, conventional treatment methods suffer from different drawbacks such as low efficiency, energy requirements, toxicity of used chemicals, corrosion, high cost, large installations, or the generation of secondary pollutants. In addition, it is not effective for small oil droplet removal, leaving about 0.5-3% of residual oil in the separated water. See Drioli et al. Hence, there is a need for new technologies that can separate small oil droplets and dissolved organics.

Membrane separation technology has a wide range of industrial applications and can be used in produced water treatment to remove the oil and grease. This technology can compete with more complex treatment technologies for treating water with high oil content, low mean particle size, and flowrates greater than 150 $m^3/h$ and is, consequently, suitable for medium and large offshore platforms. See F. E. Ciarapica, G. Giacchetta, The treatment of produced water in offshore rig: comparison between tradition installations and innovative systems, in: Fifth International Membrane Science & Technology Conference, University of New South Wales, Sydney, Australia, 10 Nov. 2003, incorporated herein by reference in its entirety.

In view of the forgoing, one objective of the present invention is to provide a membrane sorbent comprising silicon carbide nanoparticles in a polymer matrix that may be used for separating oil from a contaminated water mixture.

BRIEF SUMMARY OF THE INVENTION

According to a first aspect, the present disclosure relates to a membrane sorbent. The membrane sorbent comprises silicon carbide nanoparticles (nSiC) dispersed in a polymer matrix.

The silicon carbide nanoparticles are present at a weight percentage in a range of 1-6 wt % relative to the total weight of the membrane sorbent. The polymer matrix comprises a polysulfone polymer, and a second polymer.

In one embodiment, a weight ratio of the polysulfone polymer to the second polymer is in a range of 1.0-5.0.

In one embodiment, the membrane sorbent has a porosity in a range of 55-70%.

In one embodiment, the silicon carbide nanoparticles have a surface area in a range of 80 to 180 $m^2/g$.

In one embodiment, the silicon carbide nanoparticles have a pore size in a range of 2.7 to 3.5 nm and a pore volume in a range of 0.15 to 0.35 $cm^3/g$.

In one embodiment, the second polymer is at least one selected from the group consisting of polyvinylpyrrolidone, polyethylene, polypropylene, polyisobutylene, polystyrene, polyvinylchloride, and ethylene vinyl acetate copolymer.

In a further embodiment, the second polymer is polyvinylpyrrolidone.

In a further embodiment, the membrane sorbent consists essentially of the silicon carbide nanoparticles and the polymer matrix, and the polymer matrix consists essentially of the polysulfone polymer and polyvinylpyrrolidone.

In one embodiment, the membrane sorbent is hydrophilic, having an exterior surface with a water drop contact angle in a range of 30°-45°.

According to a second aspect, the present disclosure relates to a method for separating oil from a contaminated water mixture with the membrane sorbent of the first aspect. The method comprises the step of contacting the contaminated water mixture with a feed side of a vessel comprising the membrane sorbent. Here, the membrane sorbent divides the vessel into a feed side and a permeate side, and at least a portion of the contaminated water mixture permeates through to the permeate side of the vessel. The method also involves recovering from the permeate side a filtered water product depleted in oil compared with the contaminated water mixture.

In one embodiment, the filtered water product has a total organic carbon content by mass that is 88-100% less than a total organic carbon content of the contaminated water mixture.

In one embodiment, a pressure difference between the feed side and the permeate side is in a range of 0.5-8.0 bar.

In a further embodiment, a flux of the contaminated water mixture through a feed side of the membrane sorbent is in a range of 65-150 $L \cdot m^{-2} \cdot h^{-1}$.

In one embodiment, the contaminated water mixture is an oil-in-water emulsion, and the oil is a petroleum product.

In one embodiment, the contaminated water mixture further comprises sodium dodecyl sulfate.

In one embodiment, the method has an oil rejection that is at least 10% greater than a substantially similar membrane sorbent that does not comprise silicon carbide.

According to a third aspect, the present disclosure relates to a method of making the membrane sorbent of the first aspect. The method comprises dissolving silicon carbide nanoparticles, the polysulfone polymer, and the second polymer in a solvent to produce a mixture, casting a film from the mixture, and contacting the film with water to produce the membrane sorbent.

In one embodiment, the film is cast to a thickness in a range of 50-200 µm. In one embodiment, the silicon carbide nanoparticles are produced from rice husk ash by mixing the rice husk ash with a polysiloxane and a solvent to form a reaction mixture, heating the reaction mixture to a temperature in a range of 750 to 1250° C. to produce a bulk silicon carbide, and milling the bulk silicon carbide to produce the silicon carbide nanoparticles.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
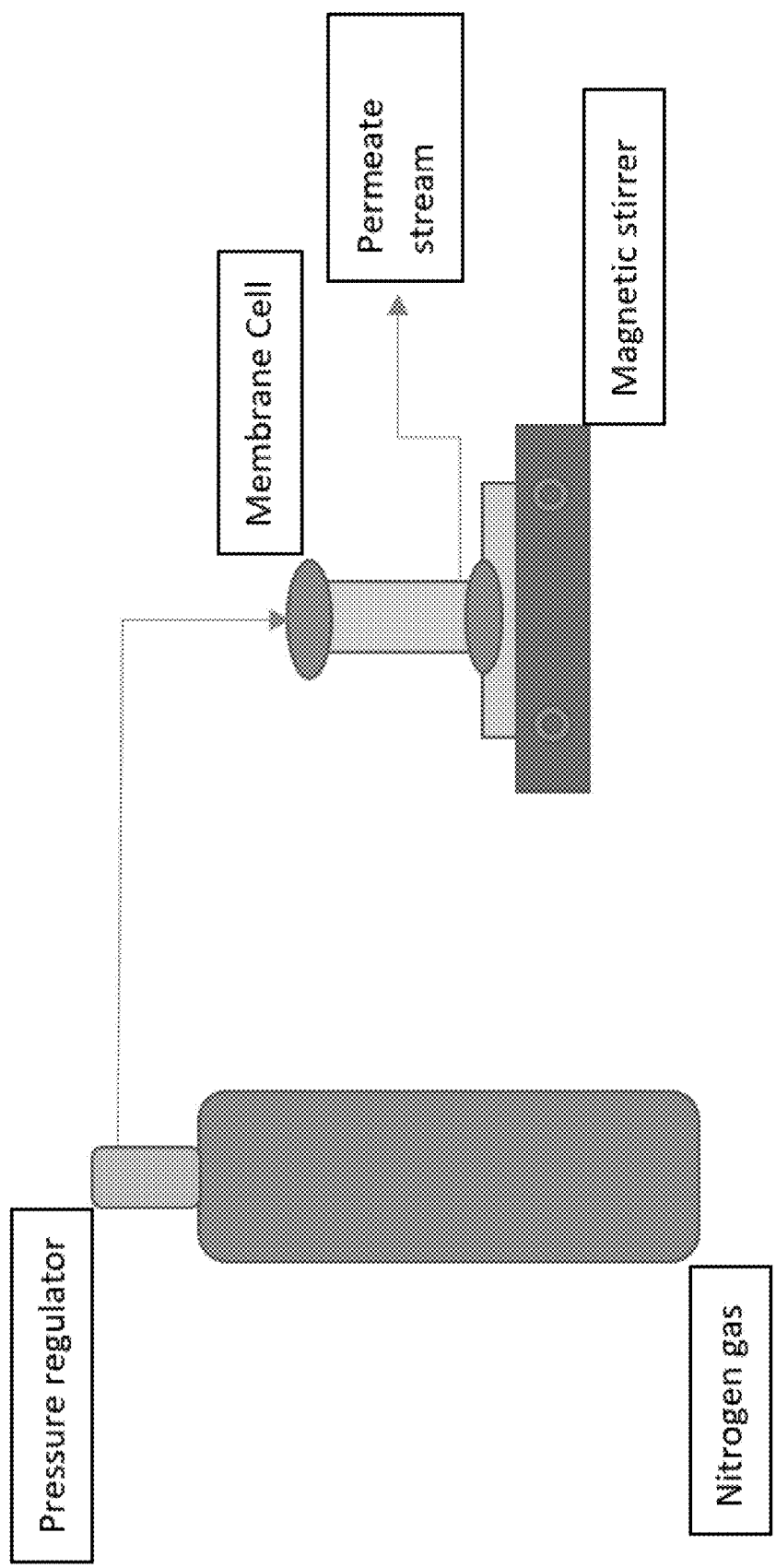
FIG. 1 shows the dead-end filtration setup for membrane separation of oil from water.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous Ni(NO$_3$)$_2$, Ni(NO$_3$)$_2$.6H$_2$O, and any other hydrated forms or mixtures. CuCl$_2$ includes both anhydrous CuCl$_2$ and CuCl$_2$.2H$_2$O.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of nickel include $^{28}$Si, $^{29}$Si, $^{30}$Si, $^{31}$Si, and $^{32}$Si. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a membrane sorbent. The membrane sorbent comprises silicon carbide nanoparticles (nSiC) dispersed in a polymer matrix. Preferably the silicon carbide nanoparticles consist essentially of silicon carbide, meaning that at least 99 wt %, at least 99.5 wt %, at least 99.9 wt %, or 100 wt % of the silicon carbide nanoparticles is silicon carbide.

The silicon carbide nanoparticles are present at a weight percentage in a range of 1-6 wt %, preferably 1.5-5.0 wt %, more preferably 2.0-4.5 wt %, even more preferably 2.2-4.0 wt %, even more preferably 2.5-3.0 wt %, relative to the total weight of the membrane sorbent.

In one embodiment, the silicon carbide nanoparticles have an average diameter of 30-200 nm, preferably 45-180 nm, more preferably 50-150 nm, more preferably 65-130 nm, more preferably 70-120 nm, though in some embodiments, the silicon carbide nanoparticles may have an average diameter of less than 30 nm or greater than 200 nm. In one preferred embodiment, the silicon carbide nanoparticles have an average diameter in a range of 50-150 nm. For instance, silicon carbide microparticles or millimeter-sized particles may be used. The silicon carbide nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. The silicon carbide nanoparticles may have one or more polymorphs. Example polymorphs include 3C (β), 4H, and 6H (α).

In one embodiment, the silicon carbide nanoparticles are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In a preferred embodiment, the silicon carbide nanoparticles are monodisperse having a particle diameter distribution ranging from 80% of the average particle diameter to 120% of the average particle diameter, preferably 85-115%, preferably 90-110% of the average particle diameter. In another embodiment, the silicon carbide nanoparticles are not monodisperse.

In one embodiment, the silicon carbide nanoparticles may be substantially spherical, meaning that the distance from the particle centroid (center of mass) to anywhere on the nanoparticle outer surface varies by less than 30%, preferably by less than 20%, more preferably by less than 10% of the average distance. In an alternative embodiment, the silicon carbide nanoparticles may have an ellipsoidal, an oblong, an ovoid, or some other rounded shape.

In one embodiment, the silicon carbide nanoparticles may have an average Wadell sphericity value in a range of 0.3 to 0.9, or 0.3 to 0.8. The Wadell sphericity of a particle is defined by the ratio of the surface area of a sphere (which has the same volume as the given particle) to the surface area of the particle. The values of Wadell sphericity range from 0 to 1, where a value of 1 is a perfect sphere, and particles become less spherical as their sphericity approaches a value of 0. The Wadell sphericity may be approximated by $$\Psi \approx \left(\frac{bc}{a^2}\right)^{1/3},$$

where a, b, and c are the lengths of the long, intermediate, and short axes, respectively of an individual particle.

In one embodiment, the silicon carbide nanoparticles have a surface area in a range of 80 to 180 m$^2$/g, preferably 90 to 170 m$^2$/g, more preferably 100 to 160 m$^2$/g, even more preferably 110 to 150 m$^2$/g, or 120 to 140 m$^2$/g.

In another embodiment, the silicon carbide nanoparticles may be mesoporous or microporous. The term "microporous" means a surface having an average pore diameter of less than 2 nm, while the term "mesoporous" means a surface having an average pore diameter of 2-50 nm.

In one embodiment, the silicon carbide nanoparticles have an average pore size in a range of 2.7 to 3.5 nm, preferably 2.8 to 3.4 nm, more preferably 2.9 to 3.3 nm, or about 3.1 nm. In one embodiment, the silicon carbide nanoparticles have a pore volume (i.e. total pore volume per weight nanoparticles) in a range of 0.15 to 0.35 cm$^3$/g, preferably 0.17 to 0.32 cm$^3$/g, more preferably 0.20 to 0.28 cm$^3$/g, even more preferably 0.22 to 0.27 cm$^3$/g, or about 0.25 cm$^3$/g.

The polymer matrix comprises a polysulfone polymer, and a second polymer. The polysulfone polymer may be polysulfone (PSU), polyethersulfone (PES), polyphenylene sulfone (PPSU), poly(arylene sulfone) (PAS), poly(bisphenol-A sulfone) (PSF), or some derivative of polysulfone. The polysulfone polymer may also be called a polyaryl sulfone or a polyarylethersulfone. In a preferred embodiment, the polysulfone polymer is polysulfone (PSU).

In one embodiment, the polymer matrix comprises at least two different types of polymers. In one preferred embodiment, the second polymer is not a polysulfone polymer. In one embodiment, the second polymer is at least one selected from the group consisting of polyvinylpyrrolidone, polyethylene, polypropylene, polyisobutylene, polystyrene, polyvinylchloride and ethylene vinyl acetate copolymer. In a preferred embodiment, the second polymer is polyvinylpyrrolidone. In other embodiments, the second polymer may be, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like, and copolymers and mixtures thereof.

In one embodiment, the polymer matrix is a homogeneous mixture of the polymers. In another embodiment, the polymer matrix may have distinctive layers or regions with different densities and/or compositions. Here, the polymer matrix may be a heterogeneous mixture of polymers and have nano-sized or micro-sized domains. Preferably the silicon carbide nanoparticles are evenly distributed throughout the polymer matrix.

In one embodiment, the polysulfone polymer and the second polymer each independently have a weight average molecular weight ($M_w$) in a range of 2-3,000 kDa, preferably 5-2,000 kDa, preferably 10-1,000 kDa, preferably 10-800 kDa, preferably 15-500 kDa, preferably 20-100 kDa. In one embodiment, the polysulfone polymer has a weight average molecular weight ($M_w$) in a range of 1-3,000 kDa, preferably 5-1,000 kDa, preferably 10-100 kDa, preferably 20-60 kDa, preferably 25-50 kDa, preferably 30-40 kDa, or about 35 kDa. In one embodiment, the second polymer has a weight average molecular weight ($M_w$) in a range of 1-3,000 kDa, preferably 2-1,000 kDa, preferably 4-100 kDa, preferably 5-40 kDa, preferably 6-20 kDa, preferably 8-12 kDa, or about 10 kDa.

The degree of polymerization (DP) is defined as the number of monomeric units in a macromolecule or polymer. In one embodiment, the polysulfone polymer and the second polymer each independently have a degree of polymerization in the range of 100-2500, preferably 150-1500, preferably 200-750, preferably 250-500. In one embodiment, an additional one or more polymers may be present in the membrane sorbent or polymer matrix, in addition to the polysulfone polymer and the second polymer. In an alternative embodiment, the polymer matrix may consist of only the polysulfone polymer or may consist of only the second polymer.

In one embodiment, a weight ratio of the polysulfone polymer to the second polymer is in a range of 1.0-5.0, preferably 1.2-4.5, more preferably 1.8-3.5, even more preferably 2.0-3.0, or about 2.4.

In one embodiment, the membrane sorbent is porous and has a porosity in a range of 55-70%, preferably 58-65%, more preferably 60-64%, or about 62.8%. In a further embodiment, this porosity may be measured by an imbibition method, for instance, using a solvent such as ethanol, methanol, or isopropanol.

In one embodiment, the membrane sorbent has an average pore size in a range of 5 nm-100 μm, preferably 10 nm-10 μm, more preferably 15 nm-5 μm, even more preferably 20 nm-1 μm, or 30-900 nm, or 40-800 nm, or 50-700 nm, or 60-600 nm, or 50-100 nm, or 100-150 nm, or 150-200 nm, or 200-400 nm, or 400-600 nm.

In one embodiment, the membrane sorbent is hydrophilic, having an exterior surface with a water drop contact angle in a range of 30°-45°, preferably 32°-43°, more preferably 34°-40°, or about 36°, or about 37°.

In one embodiment, the membrane sorbent is in the form of a porous film having an average thickness in a range of 5-400 μm, 10-300 μm, 50-200 μm, or 70-150 μm. In another embodiment, the membrane sorbent is in the form of granules having average diameters in a range of 1-100 μm, 2-50 μm, 4-40 μm, or 5-30 μm. In one embodiment, the membrane sorbent has a diameter or longest dimension in a range of 1-100 cm, preferably 2-75 cm, more preferably 3-50 cm, even more preferably 4-30 cm, or 1-5 cm, or 5-10 cm, or 10-15 cm, or 15-20 cm, or 20-25 cm, or 25-30 cm, or 30-35 cm, or 35-40 cm.

In one embodiment, the membrane sorbent consists essentially of the silicon carbide nanoparticles and the polymer matrix, and the polymer matrix consists essentially of the polysulfone polymer and polyvinylpyrrolidone. In other words, the membrane sorbent consists essentially of silicon carbide nanoparticles, polysulfone polymer, and polyvinylpyrrolidone, meaning that at least 99.0 wt %, preferably at least 99.5 wt %, more preferably at least 99.9 wt % of the membrane sorbent relative to a total weight of the membrane sorbent is silicon carbide nanoparticles, polysulfone polymer, and polyvinylpyrrolidone.

In a further embodiment, the membrane sorbent consists essentially of the silicon carbide nanoparticles, polysulfone, and polyvinylpyrrolidone, meaning that at least 99.0 wt %, preferably at least 99.5 wt %, more preferably at least 99.9 wt % of the membrane sorbent relative to a total weight of the membrane sorbent is silicon carbide nanoparticles, polysulfone, and polyvinylpyrrolidone.

In one embodiment, the membrane sorbent does not contain or is essentially free of chitosan, silicon oxycarbide, wood, wood powder, elemental carbon, active carbon, and/or free carbon.

According to a second aspect, the present disclosure relates to a method for separating oil from a contaminated water mixture by using the membrane sorbent. The contaminated water mixture may come from petroleum extraction or processing. In other embodiments, the contaminated water mixture may come from an ocean, a bay, a river, a lake, a swamp, a pond, a pool, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaners, or some other place that may generate contaminated water mixtures, or contaminated oil-water mixtures. In some embodiments, the contaminated water mixture may be in the form of an emulsion. In one embodiment, the contaminated water mixture may comprise brine, salt water, or seawater. Here, the phrase "separating oil" from a contaminated water mixture may be considered equivalent to "removing oil" from a contaminated water mixture.

In one embodiment, the oil may adopt a liquid state at room temperature (20-27° C.). The nonpolar compound may be a linear or branched alkane with a general formula of $C_nH_{2n+2}$, where n may have a value of 5-18, preferably 10-17, more preferably 12-16. In another embodiment, the nonpolar compound may have a surface tension at 19–22° C. of 10-50 mN/m, preferably 15-40 mN/m, more preferably 20-35 mN/m. In other embodiments, the oil may be some other organic molecule with a nonpolar or hydrophobic character and similar surface tension. In other embodiments, the oil may be a mixture of organic molecules, for instance, a plant-based oil or a petroleum product such as mineral oil. In one embodiment, the nonpolar compound is at least one selected from the group consisting of hexane, heptane, octane, toluene, xylene, and a petroleum-derived liquid. In one embodiment, the oil is a petroleum-derived liquid or a petroleum product, such as crude oil, kerosene, motor oil, dimethyl ether, biodiesel, gasoline, diesel, heating oil, jet fuel, and/or tar. Preferably the oil is gasoline (petrol) and/or diesel.

In another embodiment, other contaminants may be present in the contaminated water mixture. The organic contaminant may be an herbicide, a fungicide, a pesticide, a pharmaceutical compound, a steroid, a microbial toxin, a metabolite, a disinfection byproduct, an arsenic-containing compound, a food byproduct, a dye, a heavy metal, or some other organic molecule. Preferably the contaminant is one or more unwanted compounds known as an environmental pollutant.

In one embodiment, the oil may be present in the contaminated water mixture at a concentration in a range of 5-10,000 ppm, preferably 20-5,000 ppm, more preferably 100-1,000 ppm, even more preferably 250-750 ppm, or about 500 ppm.

In one embodiment, the contaminated water mixture is an emulsion, preferably an oil-in-water emulsion. In a further embodiment, the oil is a petroleum product. An emulsion is a mixture of two or more liquids that are normally immiscible (unmixable or unblendable). Two liquids can form different types of emulsions. As an example, oil and water can form, first, an oil-in-water emulsion, wherein the oil is the dispersed phase, and water is the continuous phase. Second, they can form a water-in-oil emulsion, wherein water is the dispersed phase and oil is the continuous phase. Multiple emulsions are also possible, including a "water-in-oil-in-water" emulsion and an "oil-in-water-in-oil" emulsion.

In one embodiment, the contaminated water mixture comprises a surfactant. A surfactant, as defined here, is a compound that lowers the surface tension (or interfacial tension) between two liquids or between a liquid and a solid. A surfactant may act as a detergent, a wetting agent, an emulsifier, a foaming agent, and/or a dispersant, and the surfactant may be classified as an ionic surfactant, a nonionic surfactant, or a biological surfactant, however, these classifications are not exclusory (i.e. a biological surfactant can be an ionic surfactant) and other categories of surfactants may be used.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (SLS, and also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly (propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof. In other embodiments, other additives may be used to direct the growth of the nanostructures, such as polyethylene glycol or sodium citrate. In one embodiment, the surfactant is an anionic surfactant. In a preferred embodiment, the surfactant is sodium dodecyl sulfate (SDS).

In one embodiment, the surfactant may be present in the contaminated water mixture at a concentration in a range of 5-600 mg/L, preferably 10-300 mg/L, more preferably 50-250 mg/L, even more preferably 100-200 mg/L, or about 150 mg/L. In one embodiment, a mass ratio of the oil or contaminant to the surfactant is in a range of 1.0-10.0, preferably 1.5-6.0, more preferably 2.0-5.0, even more preferably 2.5-4.0, or 3.0-4.0, or about 3.33 (1:0.3).

In one embodiment, the method further comprises a step of adding a surfactant to the contaminated water mixture.

The method comprises the step of contacting the contaminated water mixture with a feed side of a vessel comprising the membrane sorbent. Here, the membrane sorbent divides the vessel into a feed side (or feed zone) and a permeate side (or permeate zone). The membrane sorbent has both a feed side adjacent to the feed side of the vessel, and a permeate side adjacent to the permeate side of the vessel. Thus, the step of "contacting the contaminated water mixture with a feed side of the vessel" may be considered equivalent to contacting the contaminated water mixture with a feed side of the membrane sorbent. With the contacting, at least a portion of the contaminated water mixture permeates through to the permeate side of the vessel. The method also involves recovering from the permeate side a filtered water product depleted in oil compared with the contaminated water mixture.

In one embodiment, the membrane sorbent may be confined within a porous container located within the vessel. For instance, the membrane sorbent may located between two rigid porous supports, a cartridge, or within a porous bag. In one embodiment, the membrane sorbent may be located on a porous sheet (or membrane), or between two porous sheets.

In one embodiment, the porous sheet may be the main structural support for the membrane sorbent. Preferably, the porous sheet has two substantially planar faces being a first side and a second side, where the term "substantially planar" refers to height variations within any given section (e.g., sections about 3 mm in diameter) of either face being reduced to about 1 mm or less, or 0.1 mm or less, and may be in the shape of a rectangle, oval, ellipse, circle, or other shape and have a diameter or longest dimension of 0.5-10 cm, preferably 1-5 cm, more preferably 1.2-3 cm. Preferably the shape and longest dimension of the porous sheet supports a membrane sorbent having the same shape and longest dimension. In alternative embodiments, the diameter or longest dimension of the porous sheet may be larger, for instance, 10-100 cm, or 20-50 cm. In one embodiment, the porous metal sheet has a thickness, or maximum thickness, of 40-100 µm, preferably 50-95 µm, more preferably 60-90 µm, and a pore size of 0.5-4.0 µm, preferably 1.0-3.0 µm, more preferably 1.5-2.5 µm. The porous sheet may have a void volume percentage of 10-40%, preferably 12-30%, more preferably 15-25% relative to a bulk volume of the porous sheet.

The porous sheet may have first and second sides that are substantially similar or indistinguishable, for instance having essentially the same surface texture and pore size. In other embodiments, the porous sheet may have first and second sides that are different, for instance, the pores may have a generally frustoconical shape, with the smaller diameter opening on one side and the larger diameter opening on the other side. Alternatively, one side may have a different surface texture or composition than the other side.

The porous sheet may comprise a metal or metal alloy including, but not limited to aluminum, copper, brass, bronze, mild steel, stainless steel, zinc (for instance, in galvanized steel), iron, nickel, titanium, INCONEL, MONEL, NIMONIC, STELLITE, or phosphor bronze. In one embodiment, the porous sheet comprises stainless steel, preferably the stainless steel is type 304, 316, or 316L, or an austenitic chromium-nickel stainless steel doped with 2-3 wt % molybdenum. Non-metal supports may also be used as porous sheets, including but not limited to a porous glass frit, a ceramic membrane, a mesh of cellulose fibers, or a porous sheet of polyvinyl chloride, polyvinylidene difluoride, or any of the aforementioned polymers.

In one embodiment, the porous sheet may be formed from a solid, non-porous sheet by mechanically perforating the sheet, or by chemically etching pores. In another embodiment, the porous sheet may be formed by compressing together or welding fibers or microparticles (for instance, as an agglomerate of particles), by pouring a melt into a mold, or mixing a melt with a pore-forming agent that may be later dissolved or removed to create empty pores. Preferably a majority of the pores in the porous sheet are interconnected between both sides of the porous sheet, in order to allow a liquid to flow through from one side to the other.

In an alternative embodiment, an additional filtration material such as activated carbon, a zeolite, a silica gel, a resin, charcoal, fly ash, rice husk ash, sand, gravel, coarse silica, ceramic media, a capillary membrane, or a reverse osmosis membrane may be placed between porous sheets confining the membrane sorbent, or near the membrane sorbent, or the additional filtration material may be placed in direct contact with the membrane sorbent or elsewhere in the vessel.

The vessel has an internal cavity. The vessel and internal cavity may be cylindrical, cuboid, frustoconical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop water purification, the internal cavity may have a volume of 100 mL-50 L, preferably 1 L-20 L, more preferably 2 L-10 L. In another embodiment, for instance, for pilot plant purification, the internal cavity may have a volume of 50 L-10,000 L, preferably 70 L-1,000 L, more preferably 80 L-2,000 L. In another embodiment, for instance, for industrial plant-scale purification, the internal cavity may have a volume of 10,000 L-500,000 L, preferably 20,000 L-400,000 L, more preferably 40,000 L-100,000 L.

In one embodiment, the vessel comprises the membrane sorbent, which divides the internal cavity of the vessel into a feed zone and a permeate zone. In one embodiment, the internal cavity of the vessel has an inner flange, gasket, shelf, or other structural support for the membrane sorbent. Preferably, the membrane is removably attached within the internal cavity and is positioned perpendicularly to a central axis of the vessel. In one embodiment, vessels having larger volume internal cavities may have more than one membrane sorbent placed side by side and supported or secured by a perforated sheet, a grid, a mesh, a frame, or beams spanning a cross-section of the internal cavity and attached to the vessel wall. In an alternative embodiment, a side of the vessel may have a slot for a cartridge of membrane sorbent to be inserted or removed from the outside of the vessel.

In one embodiment, the feed zone is the volume of the internal cavity adjacent to the feed side of the membrane sorbent, and the permeate zone is the other part of the internal cavity, adjacent to the permeate side of the membrane sorbent. The membrane sorbent may be positioned so that the feed zone has a volume that is 30-99%, preferably 40-80%, more preferably 45-75% of the total volume of the internal cavity. The permeate zone may have a volume that is 1-70%, preferably 20-60%, more preferably 25-55% of the total volume of the internal cavity. The membrane sorbent itself may occupy a volume that is 0.001-50%, 0.1-30%, 1-20%, 2-15%, or 5-10% of the total volume of the internal cavity, or may occupy a smaller volume or a volume considered negligible in relation to the size of the internal cavity. In one embodiment, the feed zone and permeate zone have similar shapes, such as cylinders with similar diameters. However, in other embodiments either the feed zone or the permeate zone may have a smaller diameter, width, or cross-section area than the other zone. In certain embodiments, the permeate zone may have a volume that is less than 1% or essentially 0% of the total vessel volume. For instance, in these embodiments, the membrane sorbent may be attached at the bottom opening of a vessel. In one embodiment, the feed zone may have a stirring or agitation device, configured to agitate a contaminated water mixture above the membrane. This agitation device may be an impeller or a magnetic stir bar.

Preferably, the vessel and membrane sorbent are positioned so that the only route for a liquid to flow from the feed zone to the permeate zone is through the membrane sorbent. In order to permit fluid flow, the feed zone may have a feed inlet and the permeate zone may have a water outlet. For filtering an oil-water mixture or emulsion, the contaminated water mixture may enter the feed zone through the feed inlet. Water, or a filtered water product, may exit or be rejected from the permeate zone through the water outlet. In one embodiment, the feed zone additionally has an oil outlet to reject solids or liquids, such as oil, that do not pass through the membrane sorbent. In one embodiment, the feed inlet, the water outlet, and/or the oil outlet may have a diameter or width that is 1-20%, preferably 2-15%, more preferably 4-12% of the diameter or width of the internal cavity. In one embodiment, the feed inlet and/or water outlet has a diameter or width that is the same as the diameter or width of the internal cavity. For instance, a vessel may be cylindrically shaped with an open top as the feed inlet and an open bottom as the water outlet. A valve may be present on the feed inlet, water outlet, and/or oil outlet to control the flow rate of fluids. Examples of valves include, but are not limited to, ball valves, butterfly valves, globe valves, diaphragm valves, and gate valves.

In one embodiment, depending on the scale of the vessel and the permeate flow rate, the feed inlet may distribute a contaminated water mixture across the surface of a membrane sorbent by means of tubing, jets, sprinklers, flow channels, or baffles positioned in the feed zone. In one alternative embodiment, a single vessel may have two or more membrane sorbents arranged sequentially so that a fluid going from the feed inlet to the water outlet has to pass through each membrane sorbent. These membrane sorbents may have the same composition and properties or may be different from one another.

Devices to measure and record the physical and/or chemical properties of a contaminated water mixture and/or a filtered water product may be fluidly connected to the feed zone or the permeate zone, or elsewhere such a feed inlet or a water outlet. Examples of these devices include, but are not limited to, pressure gauges, flowmeters, conductivity meters, pH meters, temperature sensors, and spectrophotometers. Recorded data from a device may allow a user skilled in the art to calculate parameters, such as efficiency, product recovery, permeate flux, oil rejection, and pressure drop across the membrane sorbent. The user may then replace the membrane sorbent with a second membrane sorbent to evaluate the aforementioned parameters for the second membrane sorbent. It is envisioned that the method for comparing two membrane sorbents can be extended to a plurality of membrane sorbents. In addition, it is envisioned that the membrane sorbents can differ in the aforementioned shapes, aforementioned thicknesses, and aforementioned materials. In a preferred embodiment, the membrane sorbents have the same shape and thickness, but comprise different materials (such as with or without silicon carbide nanoparticles).

In one embodiment of the method, a pressure difference between the feed side (of the vessel or the membrane sorbent) and the permeate side (of the vessel or membrane sorbent) is in a range of 0.5-8.0 bar, preferably 0.8-5.0 bar, more preferably 1.0-4.0 bar, even more preferably 1.5-3.0 bar, or 1.8-2.5 bar, or about 2.0 bar. Alternatively, the pressure difference may be a difference in air pressure, and may be created by a pump, a vacuum pump, a piston, a compressed gas (preferably air, $N_2$ or Ar), centrifugation, evaporation, or water jet aspiration. Preferably the pressure is constant, though in alternative embodiments, the pressure may be varied. In an alternative embodiment, the pressure difference may be created solely by the weight of the contaminated water mixture on the feed side, meaning that the filtration is gravity driven. For instance, a layer of water having a height of 5 cm above a membrane exerts a pressure of 0.49 kPa on the membrane due to the weight of the water, and if this layer of water passes through the membrane sorbent without requiring other pressure, the filtration is considered to be gravity driven. The height of the water mixture may extend through the feed inlet and higher than the feed zone.

In one embodiment, a flux of the contaminated water mixture through the feed side of the membrane sorbent is in a range of 65-150 $L \cdot m^{-2} \cdot h^{-1}$, preferably 75-140 $L \cdot m^{-2} \cdot h^{-1}$, more preferably 85-130 $L \cdot m^{-2} \cdot h^{-1}$, even more preferably 95-120 $L \cdot m^{-2} \cdot h^{-1}$, or about 100 $L \cdot m^{-2} \cdot h^{-1}$, or about 101 $L \cdot m^{-2} \cdot h^{-1}$.

In one embodiment, the contaminated water mixture permeates through the feed side of the membrane sorbent at a flow speed of 0.1-20.0 mm/s, preferably 0.2-10.0 mm/s, more preferably 0.5-7.5 mm/s, even more preferably 1.0-5.0 mm/, or about 1.68 mm/s. In other embodiments, flow speeds of 20-50 mm/s or greater than 50 mm/s may be possible.

In one embodiment, the contaminated water mixture permeates through the feed side of the membrane sorbent at a flow rate in a range of 0.01-100 mL/s, preferably 0.1-50 mL/s, more preferably 1.0-10 mL/s, even more preferably 2.0-3.0 mL/s.

In one embodiment, the membrane sorbent is able to adsorb 1-100 wt %, preferably 2-50 wt %, more preferably 3-40 wt %, or 4-30 wt %, or 1-20 wt %, or 1-10 wt % oil relative to a total weight of the membrane sorbent. In one embodiment, the method further comprises a step of removing the oil from the membrane sorbent, or cleaning the membrane sorbent, so that the membrane sorbent may be reused. For instance, the membrane sorbent may be cleaned by a chemical reagent such as a solvent, surfactant, or enzymes, and/or by backwashing to remove fouling agents.

As mentioned previously, the method involves a step of recovering from the permeate side a filtered water product depleted in oil compared with the contaminated water mixture. In one embodiment, the filtered water product has a total organic carbon content that is 88-100% less, preferably 90-99% less, more preferably 91-98% less, even more preferably 92-97% less, or about 96% less than a total organic carbon content of the contaminated water mixture. This value may be considered the oil rejection, and in some embodiments, the total organic carbon content may only come from the oil. The total organic carbon content may be by mass or volume.

Figure 4:
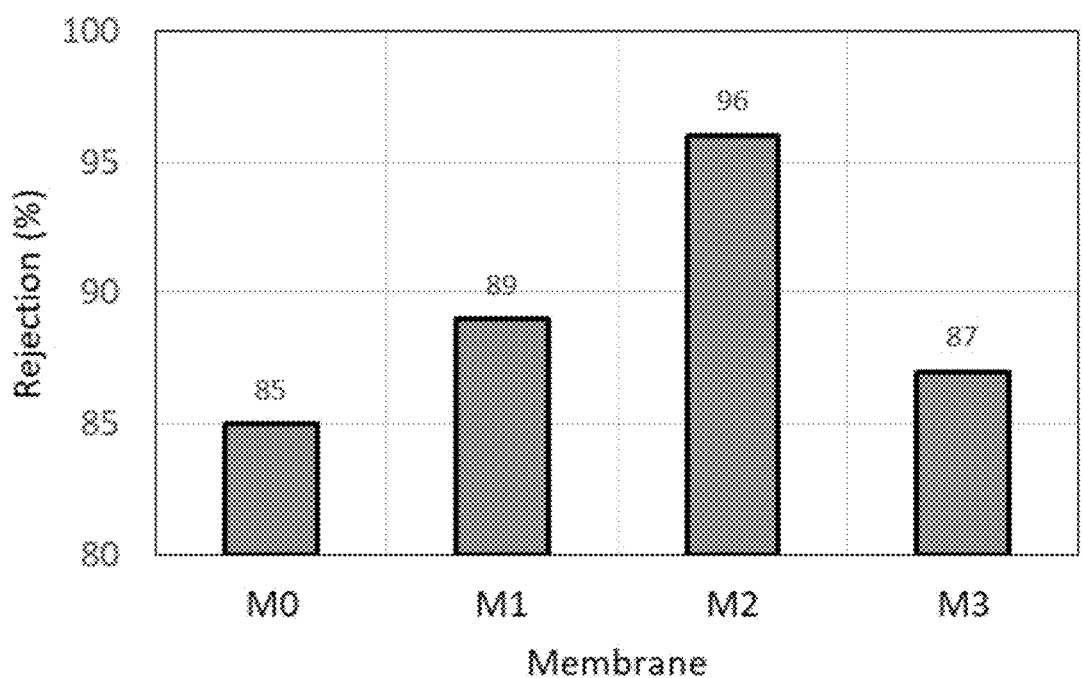
FIG. 4 shows the oil rejection of the membrane samples with 500 ppm oil and 2 bar pressure.

In one embodiment, the method has an oil rejection that is at least 10%, preferably at least 11%, more preferably at least 12%, more preferably at least 12.5% greater than a substantially similar membrane sorbent that does not comprise silicon carbide, the silicon carbide in the form of nanoparticles or some other form. For instance, in one embodiment FIG. 4 shows an 85% oil rejection for control membrane M0. The membrane sorbent M2 has an oil rejection of 96%, which is 12.9% greater than that of M0. Thus, M2 has an oil rejection that is 12.9% greater than a substantially similar membrane sorbent (here, M0) that does not comprise silicon carbide.

The method may also involve a step of reapplying the purified water product to the feed side of the membrane sorbent. A purified water product may continue to be reapplied to the membrane sorbent to further remove the oil or other contaminants. In addition, reapplying a purified water product may further remove any oil phase that has passed through the membrane sorbent.

According to a third aspect, the present disclosure relates to a method of making the membrane sorbent of the first aspect. The method comprises mixing silicon carbide nanoparticles, the polysulfone polymer, and the second polymer in a solvent to produce a mixture, casting a film from the mixture, and contacting the film with water to produce the membrane sorbent.

As used herein, the term "solvent" refers to and includes, but is not limited to, water (e.g. tap water, distilled water, deionized water, deionized distilled water), organic solvents, such as ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone, formamide, N-formylmorpholine, N-methylformamide, 2-pyrrolidone, tetramethylurea, N-vinylacetamide, N-vinylpyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. As used herein solvent may refer to non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide), polar protic solvents (e.g. acetic acid, n-butanol, isopropanol, n-propanol, ethanol, methanol, formic acid, water), and mixtures thereof. In one preferred embodiment, the solvent is an amide solvent. In a further embodiment, the solvent is dimethylacetimide, also written as N,N-dimethylacetamide.

In one embodiment, the solvent is non-polar. In a preferred embodiment, the solvent is immiscible with water.

The mixture may comprise silicon carbide nanoparticles at a weight percentage in a range of 0.1-2 wt %, preferably 0.2-1.5 wt %, more preferably 0.3-1.2 wt %, 0.4-0.8 wt %, or about 0.5 wt %, or 0.4-1.1 wt % or 0.6-0.9 wt %, relative to a total weight of the mixture.

The mixture may comprise the polysulfone polymer at a weight percentage in a range of 5-20 wt %, preferably 7-18 wt %, more preferably 9-16 wt %, or 10-14 wt %, or about 12 wt %, relative to a total weight of the mixture.

The mixture may comprise the second polymer at a weight percentage in a range of 0.5-10 wt %, preferably 1-9 wt %, more preferably 2-8 wt %, or 3-7 wt %, or about 5 wt %, relative to a total weight of the mixture.

In one embodiment, the polysulfone polymer and the second polymer are dissolved in the solvent. In one embodiment, the mixture consists of the silicon carbide nanoparticles, the polysulfone polymer, the second polymer, and the solvent. In one embodiment, the silicon carbide nanoparticles, the polysulfone polymer, the second polymer, and the solvent are combined and then mixed or agitated for 1-72 h, preferably 6-48 h, more preferably 12-36 h, or 20-30 h, or about 24 h, at a temperature in a range of 25-180° C., preferably 30-100° C., more preferably 40-80° C., even more preferably 45-55° C., or about 50° C. In one embodiment, the mixture may be sonicated, for instance, before, during, and/or after the mixing or agitating.

The mixture may be deposited on a flat surface in order to form a film. The depositing may be by casting, pouring, spin-coating, drop-coating, dip-coating, spraying, brushing, rolling, soaking, or spreading. In one embodiment, the mixture may be deposited to produce a film with an average thickness in a range of 50-200 µm, preferably 70-150 µm, more preferably 80-120 µm, or about 100 µm. Preferably the mixture is deposited by casting onto the flat surface using a casting knife. In one embodiment, the flat surface may be glass, metal, non-porous plastic, or porous plastic, such as a synthetic fabric. In one embodiment, the flat surface is a polyester plastic support, however, other polymer fabrics may be used that comprise any of the other aforementioned polymers.

The film may be contacted with water, preferably submerged in water, for a time in a range of 1-60 min, 5-45 min, 10-30 min, 12-20 min, or about 15 min to produce the membrane sorbent. In one embodiment, this contacting may induce a phase inversion, i.e., from a liquid phase to a solid phase. For instance, the film may be dissolved or partially dissolved in the solvent, or the film may be viscous, but then the film precipitates into a solid film upon contact with water, forming the membrane sorbent. Preferably the water is pure water, such as distilled, deionized, or reverse osmosis water. However, in alternative embodiments, aqueous solutions of salts or surfactants may be used instead of pure water.

Following the contacting, the film may be contacted with water a second time. For instance, the second contacting may also involve submerging and may be for a time in a range of 6-48 h, more preferably 12-36 h, or 20-30 h, or about 24 h.

In one embodiment, the silicon carbide nanoparticles are produced from rice husk ash. Rice husks are the coatings of rice grains. The husk protects the seed during the growing season and is formed from hard materials, including opaline silica and lignin. Combustion of rice husks produces rice husk ash (RHA), which is a potential source of amorphous reactive silica.

In one embodiment, the rice husk ash may be produced by heating in a furnace at a temperature in a range of 450° C.-1,200° C., preferably 500° C.-1,000° C., more preferably 550° C.-800° C., even more preferably 600° C.-750° C., or 620° C.-730° C., or 640° C.-720° C., or about 700° C. The heating may be for a time period in a range of 0.5-24 h, preferably 1-18 h, more preferably 2-16 h, even more preferably 4-8 h, or about 6 h. The heating may be in an atmosphere of air, or an inert gas such as $N_2$ and/or Ar.

Here, rice husk ash may be mixed with a polysiloxane and a solvent to form a reaction mixture. The rice husk ash and the polysiloxane may each independently be present in the reaction mixture at a weight percentage in a range of 1-6 wt %, preferably 2-5 wt %, or 3-4 wt %, relative to a total weight of the reaction mixture. In one embodiment, the rice husk ash may be present at a weight percentage of 3-4 wt %, and the polysiloxane may be present at 4-5 wt %. In one embodiment, a mass ratio of the polysiloxane to the rice husk ash may be in a range of 1.00-2.00, preferably 1.10-1.50, more preferably 1.20-1.40, or about 1.25.

In one embodiment, the polysiloxane may be considered a silicone, and may be one of polydimethylsiloxane (PDMS, also known as dimethylpolysiloxane or dimethicone), hexamethyldi siloxane, octamethyltrisiloxane, decamethyltetrasiloxane, hexamethylcyclotri siloxane, dimethiconol, decamethylcyclopentasiloxane, polymethylhydrosiloxane, disiloxane, and drometrizole trisiloxane. The polysiloxane may have a molecular weight in a range of 10-1,000 kDa, preferably 50-600 kDa.

The solvent may be present in the reaction mixture at a weight percentage in a range of 85-96 wt %, preferably 88-94 wt %, even more preferably 90-92 wt %. The solvent may comprise any of the aforementioned solvents. In one embodiment, the solvent consists of two solvent compounds having a volume ratio in a range of 1-500, preferably 2-300, more preferably 10-200, or 50-170. In one embodiment, the solvent consists of heptane and butanol having a heptane to butanol volume ratio in a range of 10-200, preferably 20-190, more preferably 150-180, or 160-170, or about 166. In one embodiment, the reaction mixture consists of rice husk ash, PDMS, heptane, and butanol.

The reaction mixture may be heated to a temperature in a range of 750 to 1,250° C., preferably 800-1,200° C., more preferably 850-1,150° C., even more preferably 900-1,100° C., or 950-1,050° C., or about 1,000° C. to produce a bulk silicon carbide. In one embodiment, the heating may be sustained for a time period in a range of 15 min-72 h, preferably 1-60 h, more preferably 6-48 h, or 12-36 h, or 18-30 h, or 20-28 h, or 22-26 h, or about 24 h. In another embodiment, the heating may be sustained for a time period in a range of 15 min-72 h, preferably 20 min-24 h, more preferably 30 min-12 h, or 35 min-4 h, or 15 min-6 h, or 30 min-3 h, or 1-3 h.

Next, the bulk silicon carbide may be pulverized, ground, or milled to produce the silicon carbide nanoparticles.

The examples below are intended to further illustrate protocols for preparing, characterizing the membrane sorbent, and uses thereof, and are not intended to limit the scope of the claims.

Example 1

Preparation of RHA and nSiC

The rice husk was washed with double-distilled water and sulfuric acid (1.0 mol/L) to remove all impurities and then dried at 100° C. for 24 hours. The dried rice husk was then transferred to a furnace and burned at 700° C. for 6 hours to prepare the Rice Husk Ash (RHA).

Silicon carbide was prepared as follows: 2.0 g of RHA and 2.5 g of polydimethylsiloxane were mixed with 50 mL heptane and 0.3 mL butanol and stirred overnight to evaporate the solvents. Then, the remaining solid was placed in the furnace and heated up to 1,000° C. to prepare the silicon carbide. The prepared SiC was ground in a ball mill for several hours to prepare nano-sized SiC (nSiC).

Example 2

Membrane Preparation

The membranes were prepared by the phase inversion method using different casting solutions containing different amounts of nSiC (Table 1). The casting solutions were prepared by dissolving nSiC, polysulfone (PSF), and polyvinylpyrrolidone (PVP) in N,N-dimethylacetamide solvent at 50° C. for 24 hours. Each casting solution was sonicated in a bath sonicator to remove air bubbles and then was casted on a polyester fabric support using a casting knife with a thickness of 100 μm. The casted film was immediately transferred to a distilled water coagulation bath and kept there for 15 minutes to induce the phase inversion. Then, the film was transferred again to another fresh bath and kept there for 24 hours to complete the phase inversion process.

TABLE 1

Composition of the casting solutions of the prepared membranes

| Membrane name | nSiC (g) | PSF (g) | PVP (g) | DMAC (g) |
|---|---|---|---|---|
| M0 | 0.00 | 2.4 | 1 | 16.6 |
| M1 | 0.05 | 2.4 | 1 | 16.6 |
| M2 | 0.10 | 2.4 | 1 | 16.6 |
| M3 | 0.20 | 2.4 | 1 | 16.6 |

Example 3

Membrane Characterization

A gravimetric method was applied to measure the porosity (ε) of the prepared membranes. A small piece of the membrane was dried under vacuum for several hours and then the mass of the dry membrane was measured ($W_1$). Afterwards, the dried membrane was immersed in ethanol for 2 hours, then the excess liquid on the surface was carefully removed using filter paper and the mass of the wet membrane was measured ($W_2$). The percent porosity was calculated via the following equation:

$$\varepsilon(\%) = \frac{(W_1 - W_2)/\rho_e}{\frac{(W_1 - W_2)}{\rho_e} + W_2/\rho_p} \times 100\%$$

where $\rho_p$ is the density of polymer, and $\rho_e$ is the density of ethanol.

To evaluate the performance of the proposed membrane for oil separation from oily water, a dead-end filtration system was used (FIG. 1) with an active membrane area of 14.6 cm$^2$, a temperature of 25° C., and a stirring speed of 1000 rpm.

The oil-water emulsion samples were prepared at different oil concentrations by mixing different amounts of gasoline and sodium dodecyl sulfate (SDS) with distilled water and stirring for 24 hours at 1000 rpm as shown in Table 2. The gasoline to SDS ratio of 1:0.3 was kept constant in all samples. The membrane coupons were compacted with DI water at 6.0 bar before the oil-water filtration experiment to stabilize the membranes. After reaching the steady state, the permeate flux was measured by:

$$Flux = \frac{V}{t \cdot A}$$

Where V is the collected permeate volume (L), t is the time (h), A is the effective membrane area (m$^2$), and the flux is in $$\frac{L}{m^2 h}$$

or (LMH).

TABLE 2

Oil-Water samples with different oil concentrations

| Concentration (ppm) | Water (L) | Oil (g) | SDS (g) |
|---|---|---|---|
| 100 | 1.0 | 0.10 | 0.030 |
| 250 | 1.0 | 0.25 | 0.075 |
| 500 | 1.0 | 0.50 | 0.150 |
| 750 | 1.0 | 0.75 | 0.225 |
| 1000 | 1.0 | 1.00 | 0.300 |

The oil rejection was calculated based on the total organic carbon (TOC) content of the emulsion before and after filtration as follows:

$$\text{Rejection}(\%) = \frac{TOC_{before} - TOC_{after}}{TOC_{before}} \times 100\%$$

Example 4

Results and Discussion

The surface area ($S_{BET}$), pore size $D_p$, and pore volume ($V_p$) of RHA and silicon carbide were obtained from nitrogen adsorption/desorption at 77 K as shown in Table 3.

TABLE 3

Textural properties of RHA power SiC

| Sample | $S_{BET}$ (m$^2$/g) | $V_p$ (cm$^3$/g) | $D_p$ (nm) |
|---|---|---|---|
| RHA | 223 | 0.25 | 3.4 |
| SiC | 130 | 0.25 | 3.1 |

RHA showed higher surface area (223 m$^2$/g) than SiC (130 m$^2$/g). The decrease in the surface area of SiC was also accompanied with a decrease in the mean pore size to 3.1 nm, which could be attributed to the pore filling with PDMS.

Figure 2A:
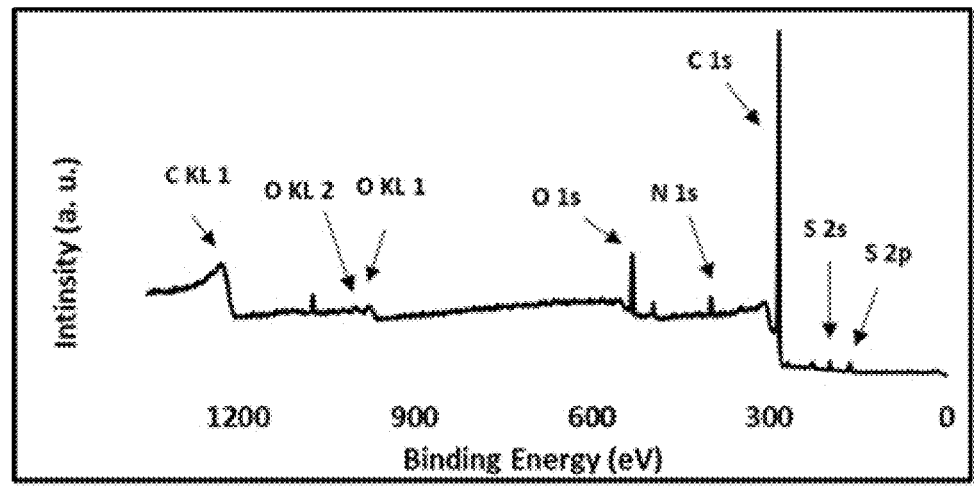
FIG. 2A is a wide scan XPS of the M0 membrane surface.
Figure 2B:
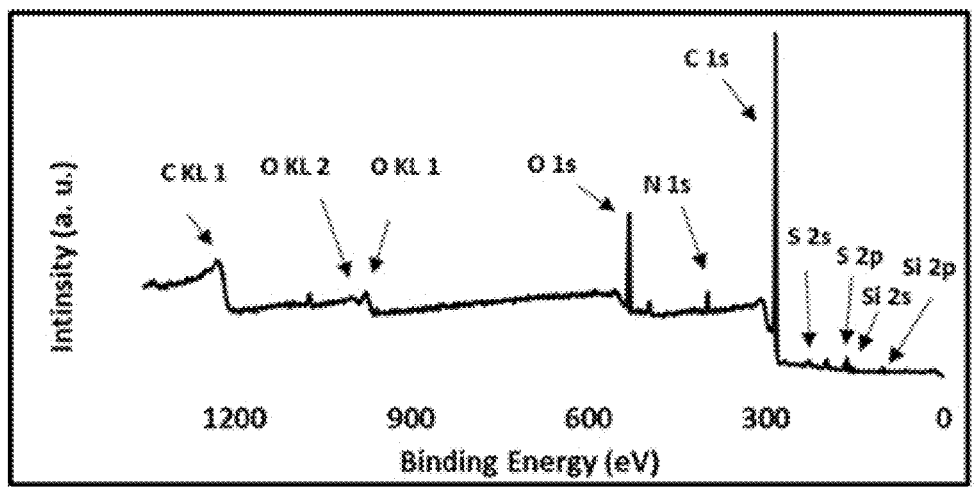
FIG. 2B is a wide scan XPS of the M2 membrane surface.

The wide scan of M0 membrane surface (FIG. 2A) using the X-ray photoelectron spectroscopy (XPS) shows the presence of oxygen, carbon, and sulfur. The wide scan of M2 membrane confirms the functionalization of the membrane with nSiC (FIG. 2B) and shows the presence of silicon in addition to oxygen, carbon, and sulfur on the surface. FIGS. 7A, 7B, 7C, and 7D show SEM images of the prepared M0, M1, M2, and M3 membrane samples, respectively.

The contact angle measurements (Table 4) of the prepared membranes shows that the contact angle decreases as the concentration of nSiC increases. The contact angle of the control sample was 69° which subsequently dropped down to 36°. This indicates that the surface of the mixed matrix membranes (M1, M2, M3) becomes more hydrophilic as the concentration of the nSiC increases. At the same time, the porosity decreased as the concentration of nSiC in the polymer solution was increased. This means that the addition of nSiC to the membrane at a concentration of up to 0.2 g per 20 g of polymer solution will enhance the surface hydrophilicity while maintaining almost the same membrane porosity.

TABLE 4

Contact angle and porosity of the prepared membranes.

| Membrane | nSiC (g) | Contact angle (°) | Porosity % |
|---|---|---|---|
| M0 | 0.00 | 69 | 67.5 |
| M1 | 0.05 | 50 | 64.5 |
| M2 | 0.10 | 37 | 62.8 |
| M3 | 0.20 | 36 | 61.4 |

Figure 3:
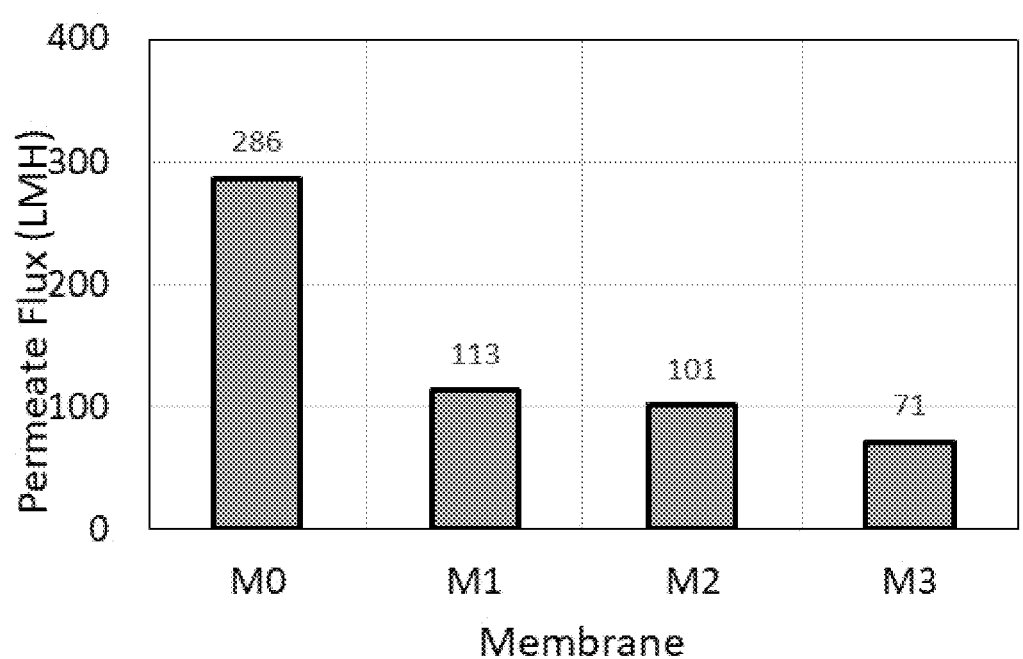
FIG. 3 shows the permeation flux of the membrane samples with 500 ppm oil and 2 bar pressure.

The permeation properties of the prepared membranes along with the control membrane are shown in FIG. 3. It was noticed that the permeate flux of the membrane is inversely proportional with the nSiC content of the membrane. Since M3 membrane has the highest nSiC content, it has the lowest permeate flux of 71 LMH.

The oil rejection by the prepared membranes is shown in FIG. 4. The highest oil rejection and the best performance was for M2 membrane, where the oil rejection reached 96%. This membrane (M2) was chosen for further analysis to investigate the effect of pressure and oil concentration of the permeation and rejection.

Figure 5:
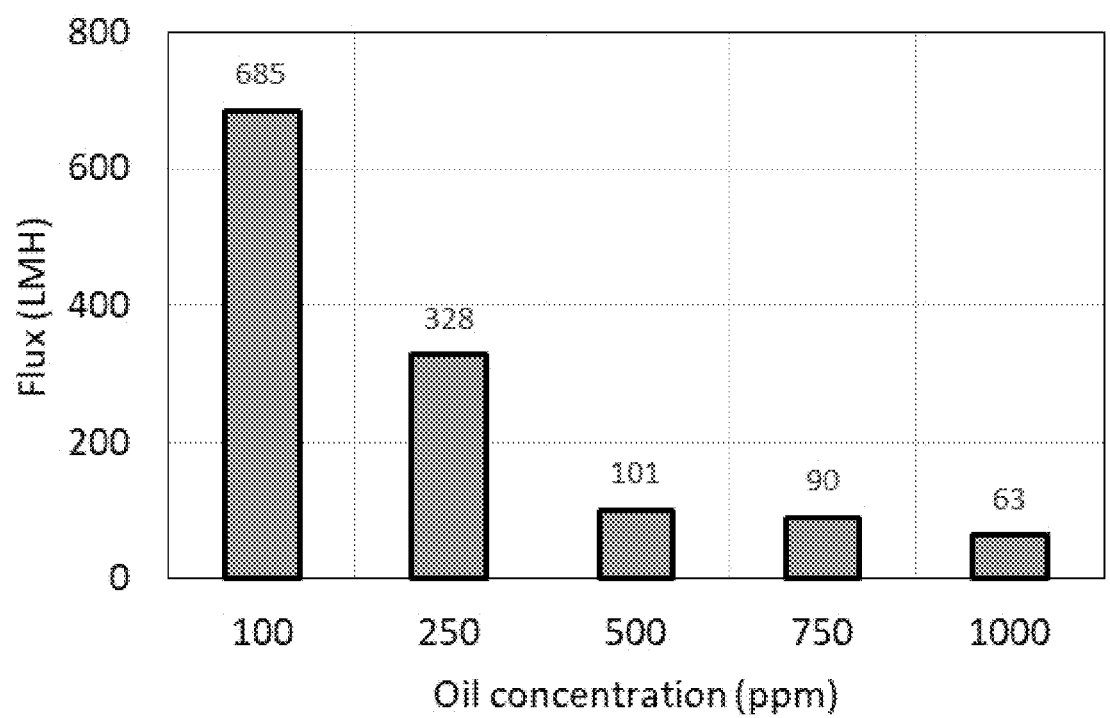
FIG. 5 shows the effect of the oil concentration on the permeability of the M2 membrane, as measured by flux, at 2 bar pressure.

The oil concentration in the feed water has a significant effect on the permeability of the membrane since it will accumulate on the membrane surface. FIG. 5 shows that as the oil concentration increases, the permeability of the membrane decreases to reach a minimum at a concentration of 1000 ppm.

Figure 6:
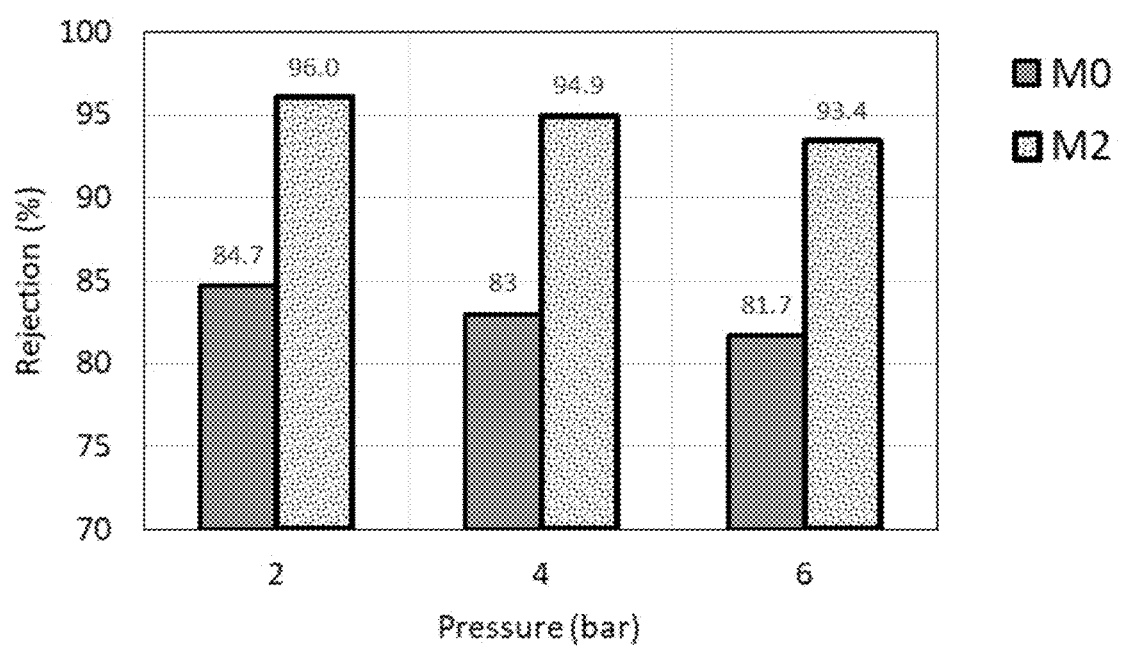
FIG. 6 compares the effect of pressure on the oil rejection of the M0 and M2 membrane samples at 500 ppm oil.
Figure 7A:
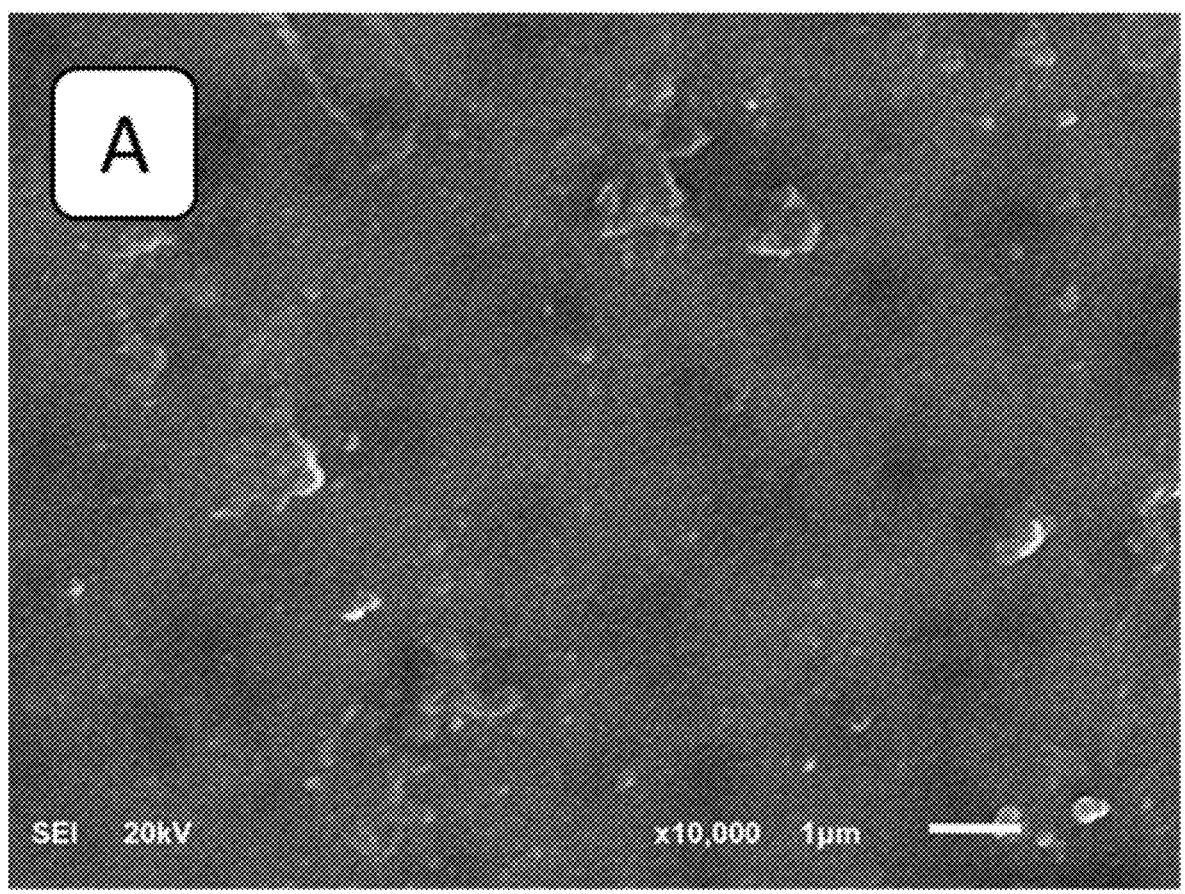
FIG. 7A is an SEM image of the M0 membrane sample.
Figure 7B:
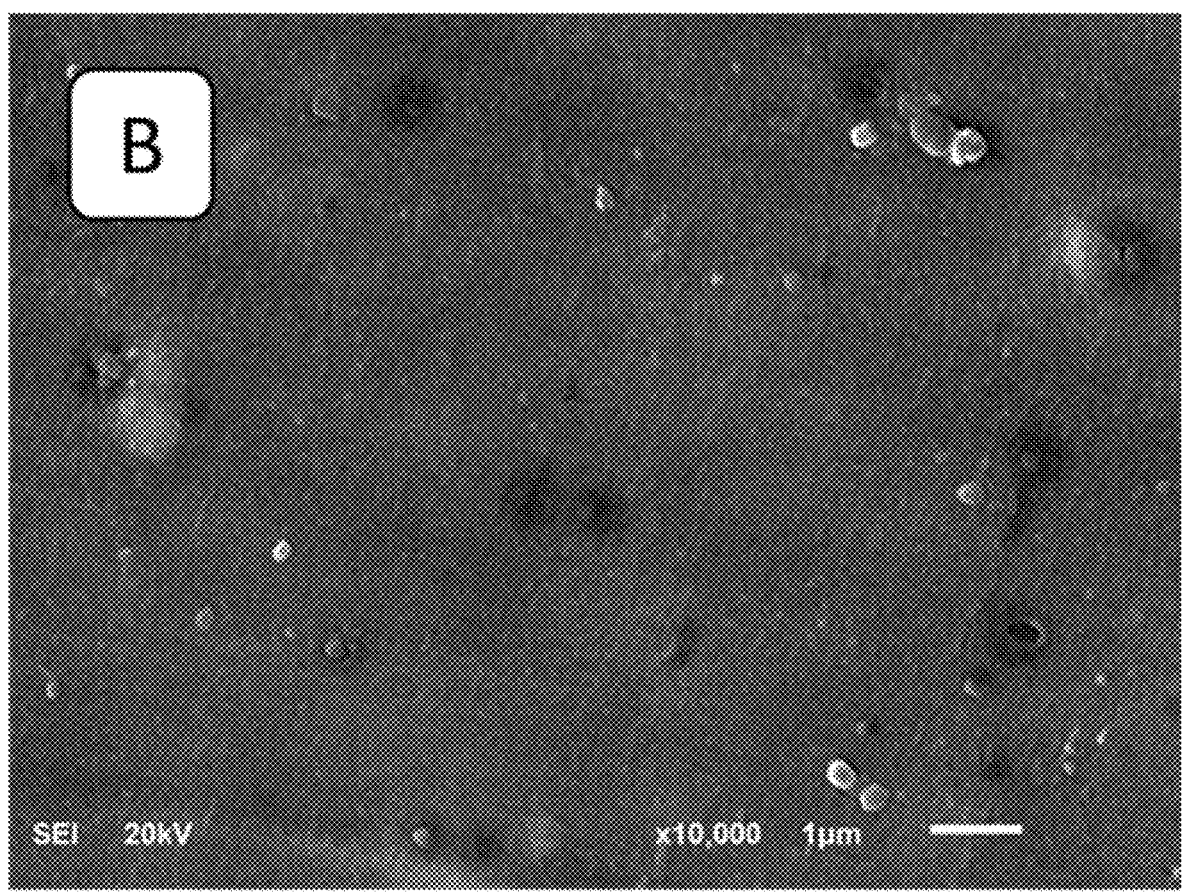
FIG. 7B is an SEM image of the M1 membrane sample.
Figure 7C:
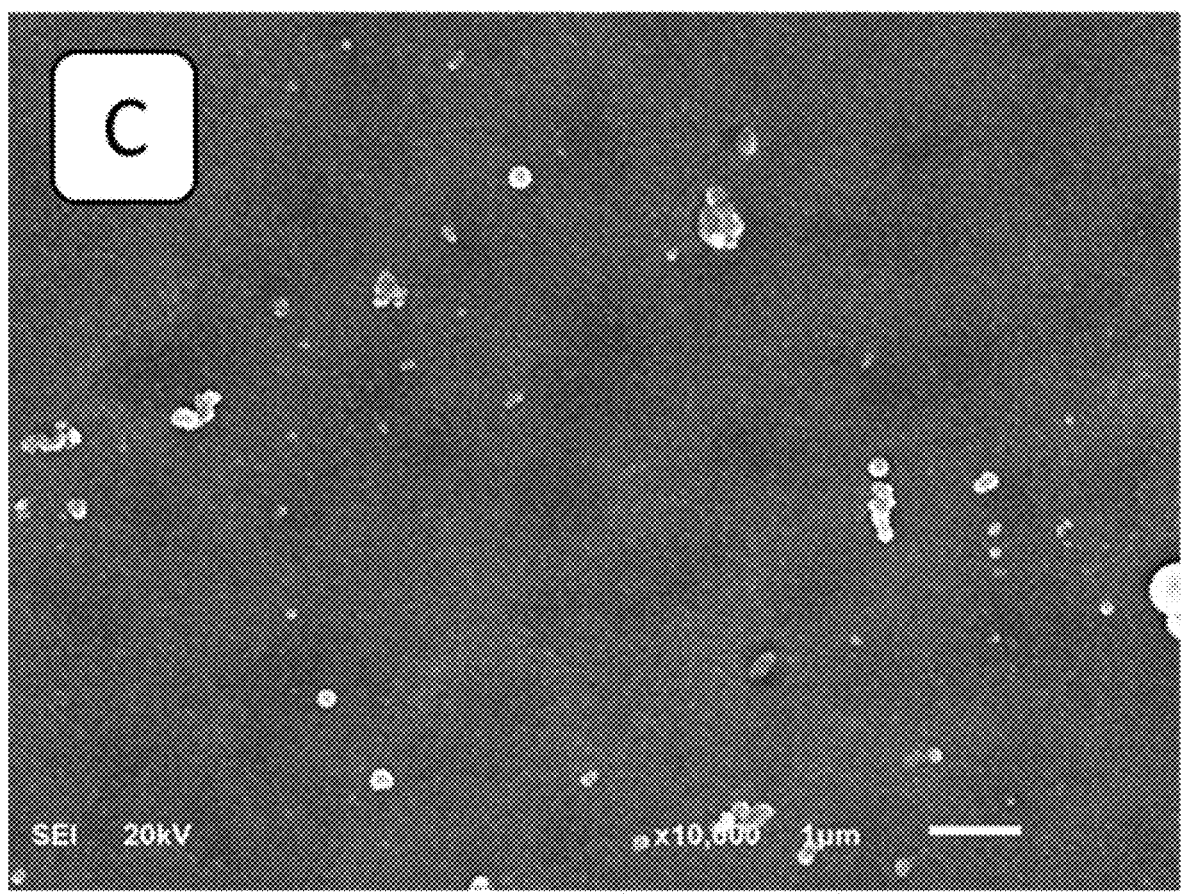
FIG. 7C is an SEM image of the M2 membrane sample.
Figure 7D:
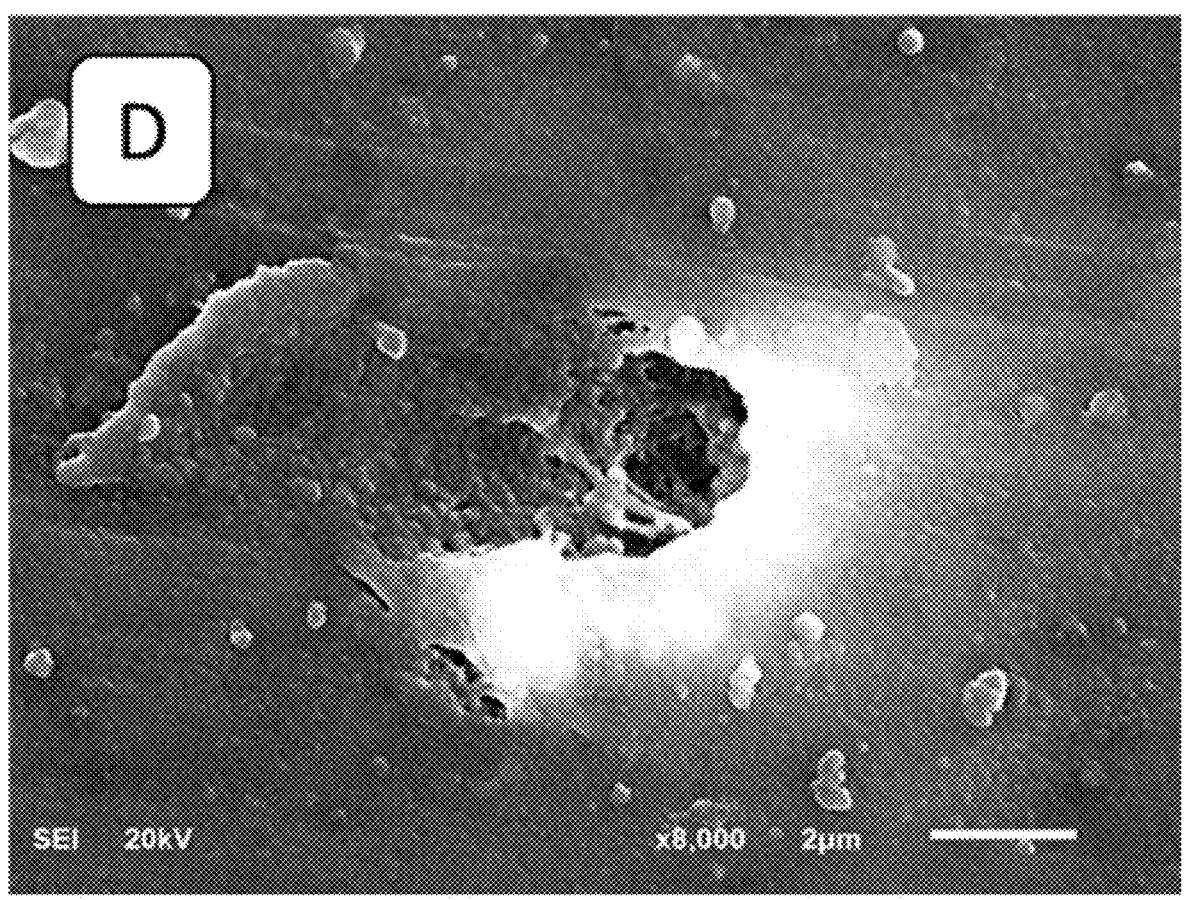
FIG. 7D is an SEM image of the M3 membrane sample.

The oil rejection was compared between the pristine membrane without nSiC (M0) and the best mixed-matrix membrane (M2) as shown in FIG. 6. At any operating pressure, the oil rejection was higher in the mixed matrix membrane as result of incorporating the nSiC.

The above invention relates to the preparation of a mixed matrix membrane comprising rice husk derivatives to separate diesel from water. Rice husk waste was utilized to prepare nano-sized silicon carbide (nSiC) which was used as a filler in a polysulfone/polyvinylpyrrolidone mixed matrix nanocomposite membrane. The nSiC as well as the prepared membranes were thoroughly characterized using SEM, EDX, TGA, XRD, and XPS. In addition, the permeation properties were also investigated using a dead-end filtration system. The mixed matrix membrane showed a significant improvement in rejection of diesel compared to the pristine membrane without the nSiC. When the concentration of nSiC in the mixed matrix membrane was 0.5% as in the M2 membrane, the diesel rejection reached 96% with a permeability of 101 LMH.

The invention claimed is:

1. A membrane sorbent, comprising:
silicon carbide nanoparticles dispersed in a polymer matrix,
the polymer matrix comprising:
a polysulfone polymer, and
a second polymer;
wherein the membrane sorbent comprises the silicon carbide nanoparticles at a weight percentage in a range of 1-6 wt % relative to the total weight of the membrane sorbent, and
wherein the silicon carbide nanoparticles have a surface area in a range of 120 to 140 $m^2/g$ and a pore volume in a range of 0.15 to 0.25 $cm^3/g$.

2. The membrane sorbent of claim 1, wherein a weight ratio of the polysulfone polymer to the second polymer is in a range of 1.0-5.0.

3. The membrane sorbent of claim 1, which has a porosity in a range of 60-64%,
wherein the second polymer is polyvinylpyrrolidone,
wherein the membrane sorbent comprises the silicon carbide nanoparticles at a weight percentage in a range of 2.5-4.0 wt % relative to the total weight of the membrane sorbent, and
wherein when the membrane sorbent is contacted with a contaminated water mixture comprising oil, and the contaminated water mixture permeates through the membrane sorbent to produce a filtered water product, the filtered water product has a total organic carbon content by mass that is 92-97% less than a total organic carbon content of the contaminated water mixture.

4. The membrane sorbent of claim 3, wherein the silicon carbide nanoparticles have an average pore size in a range of 2.9 to 3.3 nm,
wherein at least 99.5 wt % of the membrane sorbent relative to a total weight of the membrane sorbent is silicon carbide nanoparticles, polysulfone polymer, and polyvinylpyrrolidone,
wherein the membrane sorbent is hydrophilic, having an exterior surface with a water drop contact angle in a range of 32°-43°, and
wherein the silicon carbide nanoparticles are produced from rice husk ash by a method comprising:
mixing a rice husk ash with a polysiloxane and a solvent to form a reaction mixture,
heating the reaction mixture to a temperature in a range of 750 to 1250° C. to produce a bulk silicon carbide, and
milling the bulk silicon carbide to produce the silicon carbide nanoparticles.

5. The membrane sorbent of claim 1, wherein the silicon carbide nanoparticles have an average pore size in a range of 2.7 to 3.5 nm.

6. The membrane sorbent of claim 1, wherein the second polymer is at least one selected from the group consisting of polyvinylpyrrolidone, polyethylene, polypropylene, polyisobutylene, polystyrene, polyvinylchloride, and ethylene vinyl acetate copolymer.

7. The membrane sorbent of claim 6, wherein the second polymer is polyvinylpyrrolidone.

8. The membrane sorbent of claim 7,
wherein at least 99.5 wt % of the membrane sorbent relative to a total weight of the membrane sorbent is silicon carbide nanoparticles, polysulfone polymer, and polyvinylpyrrolidone.

9. The membrane sorbent of claim 1, wherein the membrane sorbent is hydrophilic, having an exterior surface with a water drop contact angle in a range of 30°-45°.

10. A method for separating oil from a contaminated water mixture with the membrane sorbent of claim 1, the method comprising:

contacting the contaminated water mixture comprising oil with a feed side of a vessel comprising the membrane sorbent;

wherein the membrane sorbent divides the vessel into a feed side and a permeate side, and wherein at least a portion of the contaminated water mixture permeates through to the permeate side of the vessel; and recovering from the permeate side a filtered water product depleted in oil compared with the contaminated water mixture.

11. The method of claim 10, wherein the filtered water product has a total organic carbon content by mass that is 88-100% less than a total organic carbon content of the contaminated water mixture.

12. The method of claim 10, wherein a pressure difference between the feed side and the permeate side is in a range of 0.5-8.0 bar.

13. The method of claim 12, wherein a flux of the contaminated water mixture through a feed side of the membrane sorbent is in a range of 65-150 $L \cdot m^{-2} \cdot h^{-1}$.

14. The method of claim 10, wherein the contaminated water mixture is an oil-in-water emulsion, and the oil is a petroleum product.

15. The method of claim 10, wherein the contaminated water mixture further comprises sodium dodecyl sulfate.

16. The method of claim 10, having an oil rejection that is at least 10% greater than a substantially similar membrane sorbent that does not comprise silicon carbide.

17. A method of making the membrane sorbent of claim 1, the method comprising:

mixing silicon carbide nanoparticles, the polysulfone polymer, and the second polymer in a solvent to produce a mixture;

casting a film from the mixture; and contacting the film with water to produce the membrane sorbent.

18. The method of claim 17, wherein the silicon carbide nanoparticles are produced from rice husk ash by mixing the rice husk ash with a polysiloxane and a solvent to form a reaction mixture, heating the reaction mixture to a temperature in a range of 750 to 1250° C. to produce a bulk silicon carbide, and milling the bulk silicon carbide to produce the silicon carbide nanoparticles.

19. The method of claim 17, wherein the solvent is dimethylacetamide.

20. The method of claim 17, wherein the film is cast to a thickness in a range of 50-200 µm.

* * * * *